(12) United States Patent
Thomsen et al.

(10) Patent No.: US 10,381,667 B2
(45) Date of Patent: Aug. 13, 2019

(54) HIGH PERFORMANCE REDOX FLOW BATTERY STACK

(71) Applicant: Battelle Memorial Institute, Richland, WA (US)

(72) Inventors: Edwin C. Thomsen, Pasco, WA (US); David M. Reed, Richland, WA (US); Brian J. Koeppel, Richland, WA (US); Kurtis P. Recknagle, West Richland, WA (US); Vilayanur V. Viswanathan, Richland, WA (US); Alasdair J. Crawford, Richland, WA (US); Zimin Nie, Richland, WA (US); Wei Wang, Kennewick, WA (US); Vincent L. Sprenkle, Richland, WA (US); Bin Li, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 386 days.

(21) Appl. No.: 15/473,401

(22) Filed: Mar. 29, 2017

(65) Prior Publication Data
US 2017/0288243 A1    Oct. 5, 2017

Related U.S. Application Data

(60) Provisional application No. 62/314,783, filed on Mar. 29, 2016.

(51) Int. Cl.
*H01M 8/04276* (2016.01)
*H01M 8/18* (2006.01)
(Continued)

(52) U.S. Cl.
CPC ..... *H01M 8/04276* (2013.01); *H01M 8/0213* (2013.01); *H01M 8/0226* (2013.01); *H01M 8/0258* (2013.01); *H01M 8/0273* (2013.01); *H01M 8/188* (2013.01); *H01M 8/2483* (2016.02); *Y02E 60/528* (2013.01)

(58) Field of Classification Search
None
See application file for complete search history.

(56) References Cited

PUBLICATIONS

Nunnery, et al., "Technologies and Market Position of Thermoset Bi-polar Plates in the U.S.," Bulk Molding Compounds, Inc., 2002, 4 pages.
(Continued)

*Primary Examiner* — Sarah A. Slifka
(74) *Attorney, Agent, or Firm* — Klarquist Sparkman, LLP

(57) ABSTRACT

A redox flow battery stack cell frame comprising a support frame and a monolithic bipolar plate integrated within the support frame is disclosed. The bipolar plate comprises a plurality of interdigitated flow channels on at least one surface. The support frame comprises an inlet manifold formed into a facing surface of the first side of the frame, the inlet manifold comprising fluid inlet distribution channels in a serpentine arrangement, each fluid inlet distribution channel aligned with a single inlet flow channel of the bipolar plate; and an outlet manifold formed into the facing surface of the opposing side of the frame, the outlet manifold comprising fluid outlet distribution channels in a serpentine arrangement, each fluid outlet distribution channel aligned with a single outlet flow channel of the bipolar plate. Redox flow battery stack cells and stacks comprising the stack cell frame are also disclosed.

16 Claims, 7 Drawing Sheets

(51) Int. Cl.
H01M 8/0273 (2016.01)
H01M 8/0213 (2016.01)
H01M 8/0226 (2016.01)
H01M 8/0258 (2016.01)
H01M 8/2483 (2016.01)

(56) References Cited

PUBLICATIONS

Reed, et al., "Advances in PNNL's Mixed Acid Redox Flow Battery Stack," *OE Energy Storage Systems Program Review*, Sep. 16-19, 2014, 16 pages.

Reed, et al., "Advances in PNNL's Mixed Acid Redox Flow Battery Stack," *OE Energy Storage Systems Program Review*, Sep. 21-24, 2014, 15 pages.

Reed, et al., "Electrical Energy Storage R&D at PNNL, Mixed Acid Redox Flow Stack Development" 2015, 2 pages.

Reed, et al., "Performance of a low cost interdigitated flow design on a 1 kW class all vanadium mixed acid redox flow battery," *Journal of Power Sources*, (2016) 306: 24-31, available online Dec. 12, 2015.

Reed, et al., "Performance of Nafion®, N115, Nafion® NR-212, and Nafion® NR-211 in a 1 kW class all vanadium mixed acid redox flow battery," *Journal of Power Sources*, (2015) 285:425-430, available online Mar. 16, 2015.

Reed, et al., "Stack Developments in a kW Class All Vanadium Mixed Acid Redox Flow Battery at the Pacific Northwest National Laboratory," *Journal of the Electrochemical Society*, (2016), 163(1); A5211-A5219, available online Nov. 21, 2015.

Sprenkle et al., "Next Generation Redox Flow Battery Development at PNNL," presented at International Battery Association, Jan. 8, 2015, 18 pages.

Sprenkle et al., "Next Generation Redox Flow Battery Development at PNNL," presented at International Battery Association, Jan. 8, 2015, 35 pages.

Prior Art
Best Available Copy

Prior Art
Best Available Copy

HIGH PERFORMANCE REDOX FLOW BATTERY STACK

CROSS REFERENCE TO RELATED APPLICATION

This application claims the benefit of the earlier filing date of U.S. Provisional Application No. 62/314,783, filed Mar. 29, 2016, which is incorporated by reference in its entirety herein.

ACKNOWLEDGMENT OF GOVERNMENT SUPPORT

This invention was made with Government support under Contract DE-AC05-76RL01830 awarded by the U.S. Department of Energy. The Government has certain rights in the invention.

FIELD

Embodiments of a redox flow battery stack cell frame, as well as redox flow battery stack cells and redox flow battery stacks comprising the cell frame, are disclosed.

BACKGROUND

Redox flow batteries have gained significant interest as a large-scale energy storage device due to their benefits over other storage technologies, which include a high degree of safety, the ability to decouple power and energy, a long lifetime, potentially low capital costs, and/or high energy efficiency. Large quantities of electricity are capable of being stored utilizing redox flow battery technology. The acceptance of redox flow batteries and a broad range of energy storage applications is dependent on continued performance improvement, cost reductions, and long-term reliability over the lifespan of the system.

SUMMARY

Embodiments of a redox flow battery stack cell frame, as well as redox flow battery stack cells and redox flow battery stacks comprising the cell frame, are disclosed. Embodiments of a redox flow battery stack cell frame include a quadrilateral support frame and a quadrilateral, monolithic bipolar plate integrated with the quadrilateral support frame. The quadrilateral, monolithic bipolar plate has a first side edge, an opposing side edge, a length $L_P$ between the first side edge and the opposing side edge, a first surface, an opposing surface, and a depth $D_P$ between the upper surface and the lower surface, the bipolar plate comprising a plurality of interdigitated flow channels in the first surface, the interdigitated flow channels comprising alternating inlet flow channels and outlet flow channels, each channel having a depth $D_C$ less than 0.5× the depth $D_P$ of the bipolar plate, wherein (i) the inlet flow channels extend inwardly from the first side edge of the bipolar plate and have a length $L_I$ less than the length $L_P$ between the first side edge and opposing side edge of the bipolar plate, and (ii) the outlet flow channels extend inwardly from the opposing side edge of the bipolar plate and have a length $L_O$ less than the length $L_P$ between the first side edge and opposing side edge of the bipolar plate. In some embodiments, the bipolar plate further comprises a plurality of interdigitated flow channels in the opposing surface. The quadrilateral support frame has a facing surface and an opposing surface, and defines an open space sized to receive the bipolar plate, wherein an inner edge of the support frame is in contact with the bipolar plate. The support frame incudes (i) an inlet port extending through a first side of the support frame; (ii) an inlet manifold formed into the facing surface of the first side of the frame and in fluid communication with the inlet port, the inlet manifold comprising a plurality of spaced-apart fluid inlet distribution channels in a serpentine arrangement, each fluid inlet distribution channel extending from the inlet port parallel to an edge of the first side for a first distance, and then diverging such that an outlet of the fluid inlet distribution channel is aligned in fluid communication with a single inlet flow channel of the bipolar plate; (iii) an outlet port extending through an opposing side of the frame; and (iv) an outlet manifold formed into the facing surface of the opposing side of the frame and in fluid communication with the outlet port, the outlet manifold comprising a plurality of spaced-apart fluid outlet distribution channels in a serpentine arrangement, each fluid outlet distribution channel extending from the outlet port parallel to an edge of the opposing side for a first distance, and then diverging such that an inlet of the fluid outlet distribution channel is aligned in fluid communication with a single outlet flow channel of the bipolar plate.

In any or all of the above embodiments, the support frame may be constructed of glass-fiber loaded vinyl ester. In any or all of the above embodiments, the bipolar plate may be constructed of graphite-loaded vinyl ester.

In any or all of the above embodiments, each inlet flow channel and outlet flow channel of the bipolar plate may have a central lengthwise axis A, an opening width W of 1-15 mm, and a taper along the central lengthwise axis A of from 0-5. In some embodiments, a pitch P between each inlet or outlet flow channel and an adjacent outlet or inlet flow channel, respectively, is from 2-8× the opening width of the inlet or outlet flow channel, wherein the pitch is the distance between the central lengthwise axis A of the inlet or outlet flow channel and the central lengthwise axis A of the adjacent outlet or inlet flow channel, respectively.

In any or all of the above embodiments, each fluid inlet distribution channel of the inlet manifold and the fluid outlet distribution channel of the outlet manifold independently may have a length/cross-sectional area ratio within a range of 15-25. In some examples, each fluid inlet distribution channel has the same length/cross-sectional area ratio and each fluid outlet distribution channel has the same length/cross-sectional area ratio. In any or all of the foregoing embodiments, each fluid inlet distribution channel and fluid outlet distribution channel independently may have (i) a length within a range of from 50 mm to 1000 mm, (ii) a depth within a range of from 0.5 to 3 mm, (iii) a width within a range of from 2 mm to 25 mm, or (iv) any combination of (i), (ii), and (iii).

Embodiments of a redox flow battery stack cell include an ion-exchange membrane; two redox flow battery stack cell frames as disclosed herein positioned on either side of the ion-exchange membrane such that the inlet manifolds and the outlet manifolds of the support frames are facing the ion-exchange membrane; and two electrodes, each electrode positioned between, and in contact with, the ion-exchange membrane and a bipolar plate of one of the two redox flow battery stack cell frames.

Embodiments of a redox flow battery stack include a stack body comprising a plurality of stacked redox flow battery stack cells as disclosed herein, wherein each bipolar plate positioned between two electrodes in the stack body (i) comprises a plurality of interdigitated flow channels on the first surface and a plurality of interdigitated flow channels on the opposing surface, and (ii) is integrated into a two support frames, each support frame adjacent to one of the two electrodes, and each comprising an inlet manifold and an outlet manifold facing the adjacent electrode. The redox flow battery stack may further include n end plate arranged at each end of the stack body, each end plate comprising a current collector in electrical communication with the stacked redox flow battery stack cells, two electrolyte inlet ports, and two electrolyte outlet ports, wherein the electrolyte inlet ports and outlet ports are in fluid communication with the inlet ports and outlet ports of the support frames.

The foregoing and other objects, features, and advantages of the invention will become more apparent from the following detailed description, which proceeds with reference to the accompanying figures.

DETAILED DESCRIPTION

Figure 1:
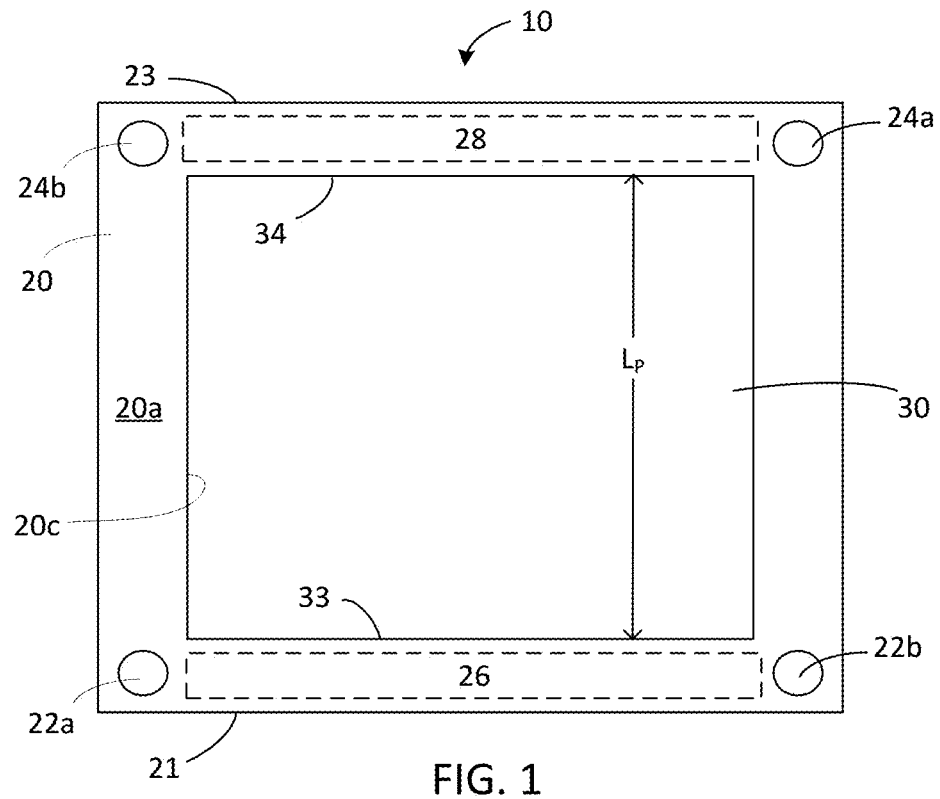
FIG. 1 is a top plan view of an exemplary redox flow battery stack cell frame.

Embodiments of a redox flow battery stack cell frame, as well as redox flow battery stack cells and redox flow battery stacks comprising the cell frame, are disclosed.

A redox flow stack battery includes two electrolyte reservoirs that are circulated through the stacked via pumps. A stack includes a number of individual cells that are connected in series or parallel, depending on the targeted application. Each cell comprises an anode and a cathode that is separated by an ion exchange membrane. The ion exchange membrane prevents the mixing of electrolyte solutions from the two redox couples but allows the diffusion of the preferred ion across the membrane. The cells are then formed into stacks using a bipolar plate to make electrical connections between cells.

In conventional designs, the electrodes are porous, and the bipolar plate has a flat surface in contact with the electrode. A support frame surrounding the bipolar plate includes an inlet manifold and an outlet manifold including one or more fluid distribution channels used to distribute electrolyte to the surface of the bipolar plate in contact with the electrode. This arrangement, however, suffers from several disadvantages including high shunt currents and/or large pressure drops. Embodiments of the disclosed redox flow stack batteries include features that mitigate these deficiencies.

I. Definitions

The following explanations of terms and abbreviations are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the following detailed description and the claims.

Unless otherwise indicated, all numbers expressing quantities of components, molecular weights, percentages, temperatures, times, and so forth, as used in the specification or claims are to be understood as being modified by the term "about." Accordingly, unless otherwise implicitly or explicitly indicated, or unless the context is properly understood by a person of ordinary skill in the art to have a more definitive construction, the numerical parameters set forth are approximations that may depend on the desired properties sought and/or limits of detection under standard test conditions/methods as known to those of ordinary skill in the art. When directly and explicitly distinguishing embodiments from discussed prior art, the embodiment numbers are not approximates unless the word "about" is recited.

Definitions of common terms in chemistry may be found in Richard J. Lewis, Sr. (ed.), *Hawley's Condensed Chemical Dictionary*, published by John Wiley & Sons, Inc., 1997 (ISBN 0-471-29205-2).

In order to facilitate review of the various embodiments of the disclosure, the following explanations of specific terms are provided:

Bipolar Plate:

A conductive plate that has a positively charged surface and a negatively charged surface during use in a redox flow battery.

Electrolyte:

A substance containing free ions that behaves as an electrically conductive medium. Electrolytes generally comprise ions in a solution.

Interdigitated:

The term interdigitated literally means interlocked as in interlocked fingers of two hands. As used herein, the term interdigitated refers to fluid flow channels of a bipolar plate that extend across the plate alternately from one side edge or an opposing side edge of the plate.

Manifold:

As used herein, the term "manifold" refers to plurality of fluid distribution channels that are in fluid communication with an inlet port or outlet port.

Pitch:

As used herein, the term "pitch" refers to the distance between the central lengthwise axis of a flow channel and the central lengthwise axis of an adjacent flow channel.

Shunt Current:

An electrical current that forms due to short-circuiting within liquid electrolytes. Shunt currents consume available discharge energy or delivered charge energy shunt current losses are present in a redox flow battery stack during charging, discharging, and/or under open circuit conditions shunt currents lead to the loss of usable energy and potentially shorten the battery's useful life.

II. Redox Flow Battery Stack Cell Frame

With reference to FIGS. 1-5B, embodiments of a redox flow battery stack cell frame 10 comprise a support frame 20 and a bipolar plate 30 integrated with the support frame 20. In some embodiments, the support frame 20 is a quadrilateral support frame, and the bipolar plate 30 is a quadrilateral, monolithic bipolar plate.

As shown in FIG. 1, the support frame 20 comprises a first side 21, an opposing side 23, a facing surface 20a, and an opposing surface 20b. An inner edge 20c of the support frame 20 defines an open space size to receive the bipolar plate 30, wherein the inner edge 20c of the support frame 20 is in contact with the bipolar plate 30. Details of the bipolar plate are shown in FIGS. 2-5B. The bipolar plate 30 may be adhesively secured to the support frame 20. Alternatively, a gasket (not shown) may be used to provide a seal between edges of the bipolar plate 30 and edges of the support frame 20. The support frame 20 further comprises inlet ports 22a, 22b extending through the first side 21 of the support frame, and outlet ports 24a, 24b extending through the opposing side 23 of the support frame. As described in detail below, an inlet manifold 26, and an outlet manifold 28 are formed in the lower surface 20b of the support frame 20. The support frame 20 may be constructed of any suitable insulative material. In one embodiment, the support frame 20 is constructed of polyvinylchloride. In another embodiment, the support frame 20 is constructed of a glass fiber-loaded vinyl ester. The glass fiber-loaded vinyl ester may be suitable for compression and/or injection molding.

Figure 2:
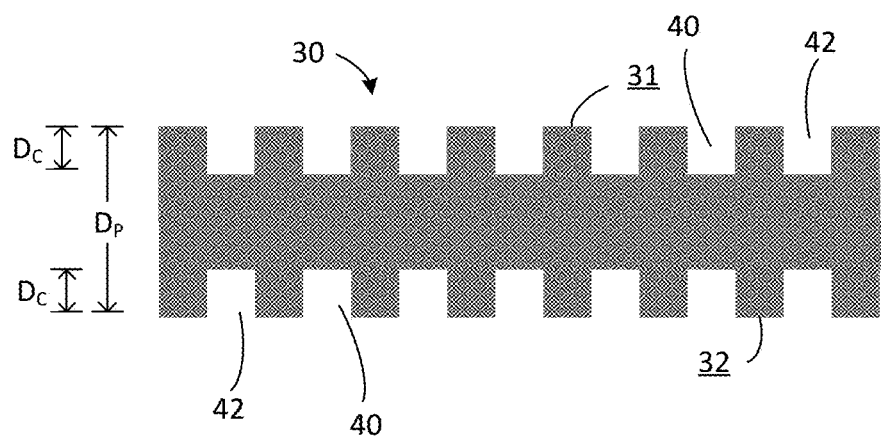
FIG. 2 is a cross-sectional view of an exemplary monolithic bipolar plate.
Figure 3:
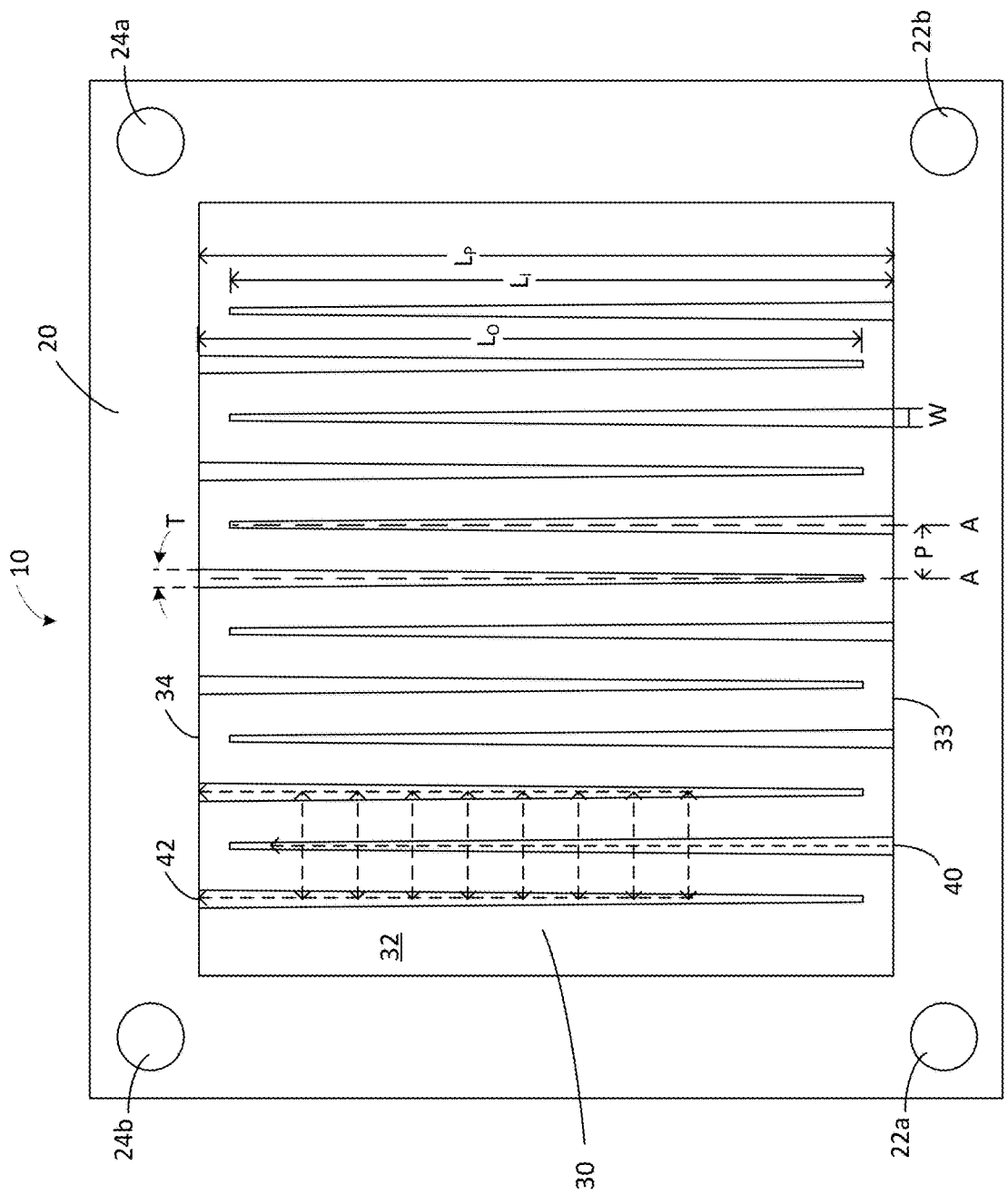
FIG. 3 is a plan view of the redox flow battery stack cell frame of FIG. 1.

With reference to FIGS. 2 and 3, a quadrilateral, monolithic bipolar plate 30 has a first surface 31, an opposing surface 32, a first side edge 33, an opposing side 34, and a length $L_P$ between the first side edge 33 and the opposing side edge 34. Advantageously, the bipolar plate has a surface area (length×width) greater than or equal to the size (length× width) of an adjacent electrode. A plurality of interdigitated flow channels comprising alternating inlet flow channels 40 and outlet flow channels 42 is formed in the first surface 31. In some embodiments, a plurality of interdigitated flow channels comprising alternating inlet flow channels 40 and outlet flow channels 42 is also formed in the opposing surface 32 of the bipolar plate. The flow channels may be formed by any suitable method, for example, by machining or pressing the flow channels into the bipolar plate 30.

The bipolar plate 30 may be constructed of any suitable electrically conductive material. Suitable materials include, but are not limited to, metals, pure graphite, and graphite powders bound together with resins, such as graphite-loaded phenolic, epoxy, polyester, and vinyl ester resins. In some embodiments, the bipolar plate 30 is constructed of a graphite-loaded vinyl ester, such as a thermoset graphite-loaded vinyl ester. Advantageously, a bipolar plate 30 constructed of graphite-loaded vinyl ester may be pressed to shape the inlet flow channels 40 and outlet flow channels 42, rather than machining the flow channels. When the bipolar plate 30 and/or the support frame 20 are constructed of materials including vinyl esters, a vinyl ester adhesive may be used to secure the bipolar plate to the support frame.

As shown in FIG. 2, each flow channel 40, 42 has a depth $D_C$ less than $0.5 \times D_P$, where $D_P$ the depth of the bipolar plate 30 as measured from the first surface 31 to the opposing surface 32. In some embodiments, the bipolar plate 30 has a depth $D_P$ of from 3 mm to 9 mm, such as from 4 mm to 6 mm, and each flow channel 40, 42, has a depth $D_C$ of from 1 to 3 mm, such as from 1 mm to 2 mm.

As shown in detail in FIG. 3, the inlet flow channels 40 extend inwardly from the first side edge 33 of the bipolar plate 30 and have a length $L_I$ less than the length $L_P$ between the first side edge 33 and opposing side edge 34 of the bipolar plate 30, thereby providing a closed distal end. The outlet flow channels 42 extend inwardly from the opposing side edge 34 of the bipolar plate and have a length $L_O$ less than the length $L_P$ between the first side edge 33 and opposing side edge 34 of the bipolar plate 30, thereby providing a closed distal end. For ease of viewing, the inlet and outlet manifolds 26, 28 are not shown in FIG. 3.

Each inlet and outlet flow channel 40, 42 has a central lengthwise axis A. In some embodiments, each inlet and outlet flow channel, 40, 42 has an opening width W of 1-15 mm, and a taper T along the central lengthwise axis A within a range of 0-5°. Narrow flow channels 40, 42 minimize added ohmic loss due to longer current paths that can create a larger pressure gradient along their length. Advantageously, tapered flow channels 40, 42 mitigate this problem and provide a pressure gradient that does not vary significantly along the flow channel length at higher flow rates, thereby improving velocity uniformity and facilitating use of higher flow rates. A pitch P between each inlet or outlet flow channel, 40, 42 and an adjacent outlet or inlet flow channel, respectively, is from 2-8× the opening width W of the inlet or outlet flow channel. The pitch P is the distance between the central lengthwise axis A of the inlet or outlet flow channel and the central lengthwise axis A of the adjacent outlet or inlet flow channel, respectively.

Figure 4:
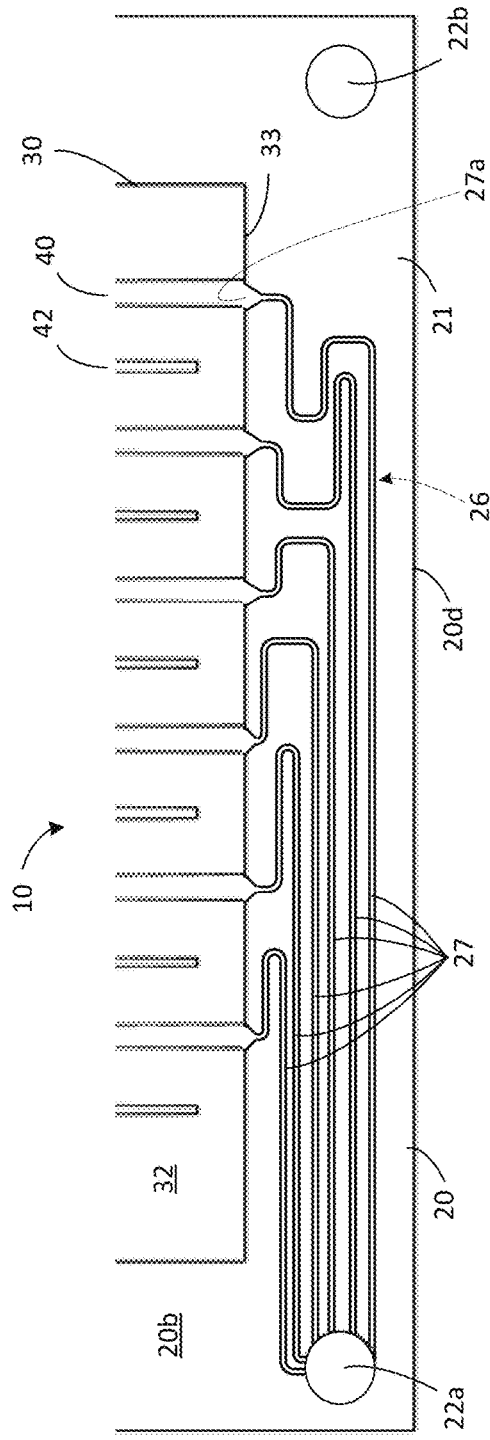
FIG. 4 is a plan view of a portion of the redox flow battery stack cell frame of FIG. 1 showing details of the inlet manifold.

As shown in detail in FIG. 4, an inlet manifold 26 is formed into the lower surface 20b of the first side 21 of the support frame 20. The inlet manifold 26 comprises a plurality of spaced-apart fluid inlet distribution channels 27 in a serpentine arrangement. Each fluid inlet distribution channel 27 extends from the inlet port 22a parallel to an outer edge 20d of the first side 21 for a first distance, and then diverges such that an outlet 27a of the fluid inlet distribution channel 27 is aligned in fluid communication with a single inlet flow channel 40 of the bipolar plate 30. This feature stands in contrast to other inlet manifolds, wherein a single fluid inlet distribution channel is in fluid communication with a plurality of inlet flow channels of the bipolar plate. As described below, when arranged in a stack, alternating redox flow battery stack cell frames 10 are oriented such that the inlet manifold 26 faces an electrode in contact with the bipolar plate.

Common problems in redox flow battery stacks include the presence of shunt currents within and between cells in the stack, as well as pressure drop across the manifold and/or bipolar plate. One method to manage shunt currents involves providing long, small cross-section flow channels. Such flow channels create a high electrical resistance from one end of the channel to the other, thereby reducing the shunt current. However, the channels also create a pressure drop which increases pumping requirements and system fluid pressures. The requirements for low pumping loss of the electrolyte (e.g., larger cross-section channels with short lengths) oppose the requirements for low shunt currents through the channels (e.g., small cross-section channels with long lengths). Embodiments of the disclosed inlet and outlet manifolds address these competing issues by balancing the shunt current and the pressure drop to maximize the stack efficiency. The interdigitated flow channels of the disclosed bipolar plates also contribute to less pressure drop compared to bipolar plates without flow channels where a layer of electrolyte flows across the plate's surface.

In some embodiments, the length and cross-sectional area of each fluid inlet distribution channel 27 is selected to provide a substantially constant fluid flow rate through each of the fluid inlet distribution channels 27. For example, the cross-sectional area of the fluid inlet distribution channel is proportional to the length of the fluid inlet distribution channel. Thus, a shorter fluid inlet distribution channel may have a smaller cross-section than a longer fluid inlet distribution channel. Advantageously, this flow pattern facilitates a higher pumping rate with less power and pressure than that required for other manifold designs. In some embodiments, the fluid inlet distribution channels may have lengths within a range of from 50 mm to 1000 mm and have a cross-sectional area (e.g., width×depth for a rectangular cross-section, or $0.5 \times \pi \times r^2$ (r=radius) for a semicircular cross-section) within a range of from 3 mm$^2$ to 50 mm$^2$. In certain examples, the fluid inlet distribution channels may have a depth within a range of from 0.5 mm to 3 mm and a width as measured at the surface of the support frame within a range of from 2 mm to 25 mm. In some embodiments, the fluid inlet distribution channels have a length/cross-sectional area ratio within a range of 15-25, such as within a range of 18-20.

In some embodiments, each fluid inlet distribution channel 27 has a semicircular cross-section, a semi-oval, V-shaped, rectangular, or other polygonal cross-section. In general, a circular or near circular cross-section has a lower resistance than that a cross-section with a large aspect ratio. However, pumping losses can be mitigated somewhat by changing the cross-sectional shape while keeping the same area, which maintains the same shunt current. Shunt power loss is approximately linear with the channel length and the channel area. This indicates that while the pumping power required is proportional to the ratio of channel length/areae, the shunt power loss is proportional to the ratio of channel area/length. To obtain the lowest pumping losses, the fluid inlet distribution channels 27 have a square cross-section in some embodiments. The cross-sectional area and length of each fluid inlet distribution channel 27 is adjusted to achieve a desired manifold electrical resistance/shunt current profile.

Figure 5:
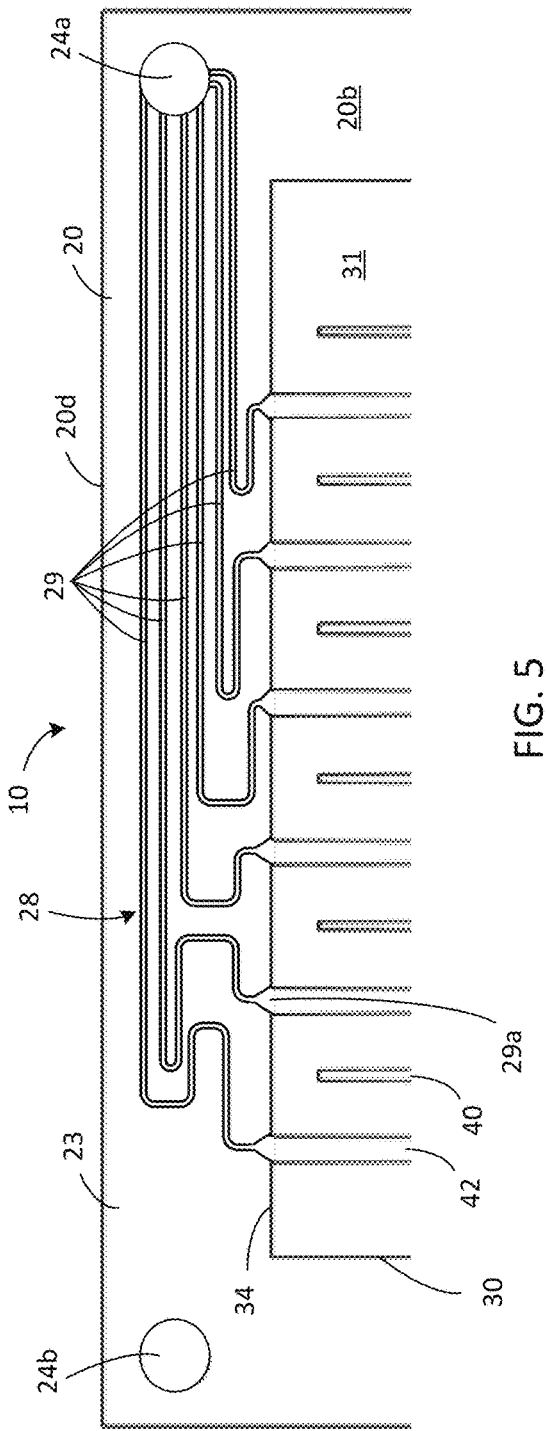
FIG. 5 is a plan view of a portion of the redox flow battery stack cell frame of FIG. 1 showing details of the outlet manifold.

As shown in FIG. 5, an outlet manifold 28 is formed into the lower surface 20b of the opposing side 23 of the support frame 20. The outlet manifold 28 comprises a plurality of spaced-apart fluid outlet distribution channels 29 in a serpentine arrangement. Each fluid outlet distribution channel 29 extends from the outlet port 24b parallel to an outer edge 20d of the opposing side 23 for a first distance and then diverges such that an inlet 29a of the fluid outlet distribution channel 29 is aligned in fluid communication with a single outlet flow channel 42 of the bipolar plate 30. As described below, when arranged in a stack, alternating redox flow battery stack cell frames 10 are oriented such that the outlet manifold 28 faces an electrode in contact with the bipolar plate. Dimensions of the fluid outlet distribution channels 29 are as described previously for the fluid inlet distribution channels 27.

Figure 6A:
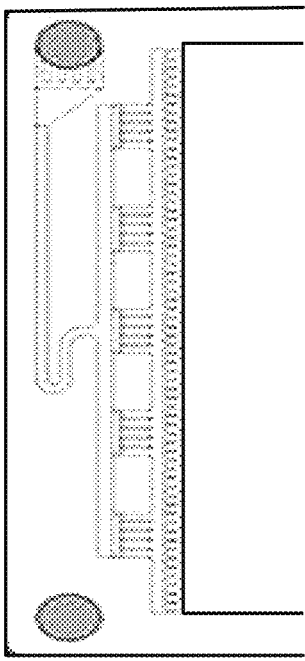
FIGS. 6A and 6B are plan views of alternate prior art manifold designs.
Figure 6B:
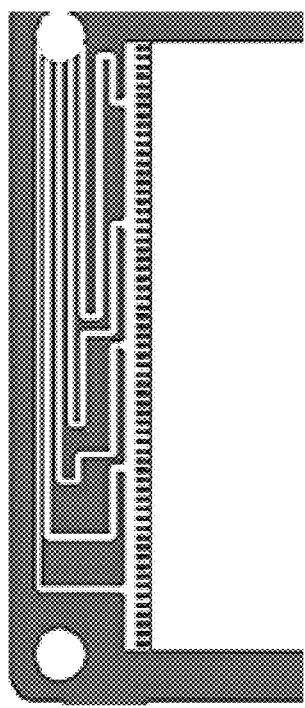

For comparison, FIGS. 6A and 6B show prior manifold designs wherein a support frame includes a manifold that distributes electrolyte to a bipolar plate (with or without interdigitated channels) via a single fluid distribution channel extending across the frame. Inlet and outlet manifolds such as those shown in FIGS. 4A-5B provide advantages over the inlet/outlet manifolds of FIGS. 6A and 6B. In particular, embodiments of the disclosed inlet and outlet manifolds have a reduced pressure drop and reduced variation in fluid flow rates throughout the fluid distribution channels compared to the manifolds of FIGS. 6A and 6B.

Embodiments of the disclosed manifold design as shown in FIGS. 4 and 5 provide a lower shunt current and/or a lower pressure drop than a manifold design including a single fluid inlet distribution channel that distributes electrolyte to all inlet flow channels or single outlet collection channel that collects electrolyte from all outlet flow channels, thereby improving efficiency of the redox flow battery stack cell frame. In some embodiments, the shunt loss (shunt current/load current) is no more than 1-2% for a stack including from 1-40 stack cells as described below.

III. Redox Flow Battery Stack and Cells

Figure 7:
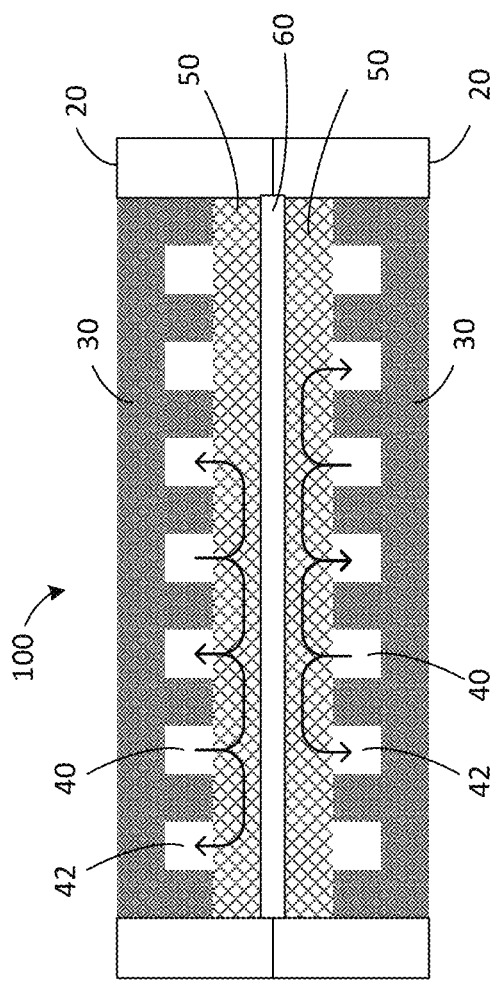
FIG. 7 is a cross-sectional view of an exemplary redox flow battery stack cell.

With reference to cross-sectional view of FIG. 7, a redox flow battery stack cell 100 comprises two electrodes 50 and an ion-exchange membrane 60. The electrodes 50 are disposed on either side of and in contact with the ion-exchange membrane 60. The redox flow battery stack cell 100 further comprises two redox flow battery stack cell frames 10 as disclosed herein. A redox flow battery cell frame 10 comprising a support frame 20 and bipolar plate 30 is positioned such that a bipolar plate 30 is in contact with each electrode 50. The cell frame 20 is oriented such that the inlet manifold 26 and outlet manifold 28 face the electrode. As discussed in detail below, when multiple stack cells are combined, each bipolar plate within the stack is shared between two adjacent stack cells.

Advantageously, the electrode 50 is porous so that an electrolyte may flow through the electrode. In some embodiments, the electrode 50 comprises a carbonaceous material, such as a woven carbon cloth or carbon felt. In certain examples, the electrode 50 comprises one or more layers of woven carbon cloth having a thickness of 300-1000 µm. For instance, the electrode 50 may comprise two layers of woven carbon cloth, each layer having a thickness of 400-500 µm, thereby providing an electrode having an overall thickness of 800-1000 µm. Exemplary woven carbon cloths include, but are not limited to, ELAT® woven carbon cloth (available from NuVant Systems Inc., Crown Point, Ind.). In some embodiments, the electrode has an active surface area of at least 500 cm$^2$, such as from 500-2000 cm$^2$ or 500-1500 cm$^2$.

The ion-exchange membrane 60 may be any ion-exchange membrane that is compatible with the desired electrolyte. In some embodiments, the ion-exchange membrane 60 comprises a perfluorosulfonic acid/polytetrafluoroethylene copolymer in a protonated form. The ion-exchange membrane 60 may have a thickness from 25-175 µm, such as a thickness from 25-100 µm or 25-50 µm. Exemplary membranes include, but are not limited to, Nafion™ N115, NR-212, and NR-211 membranes (available from Ion Power, Inc., New Castle, Del.). Because the ion exchange membrane has some intrinsic resistance, it may be advantageous to minimize the thickness of the ion exchange membrane. For example, reducing the membrane thickness from 125 µm to 50 µm was found improve voltage efficiency by 3 to 5% in a redox flow stack battery including three stack cells.

The dashed arrows in FIG. 3 and the arrows in FIG. 7 illustrate the direction of electrolyte flow through the redox flow battery stack cell 100. An electrolyte flowing through an inlet flow channel 40 cannot directly exit the inlet flow channel because the distal end of the inlet flow channel is closed (FIG. 3). As shown in FIG. 7, the electrolyte flows from the inlet flow channel 40 into the electrode 50, through the electrode 50 in a direction substantially perpendicular to the inlet flow channel 40, and subsequently into adjacent outlet flow distribution channels 42. Electrolyte flowing into the outlet flow distribution channel 42 flows into an inlet 29a of a fluid outlet distribution channel 29, and subsequently exits the outlet manifold 28 through the outlet port 24a, 24b (see, e.g., FIG. 5). On one side of the cell 100, the electrolyte is a catholyte. On other side of the cell 100, the electrolyte is an anolyte. As shown in FIGS. 3 and 7, the electrolyte travels only a short distance through the porous electrode 50 between the inlet flow channel 40 and the outlet flow channel 42, thereby reducing pressure drop compared to a redox flow battery stack cell utilizing a flat bipolar plate wherein the electrolyte must flow through the entire length of the electrode as it passes through the stack cell from the inlet manifold to the outlet manifold of the support frame ("flow-through design"). In some embodiments, the pressure drop is 2-4× lower than the pressure drop of a redox flow battery stack cell utilizing a flow-through design. The reduced pressure drop allows increased flow rates compared to battery stack cells with a flow-through design.

The redox flow battery stack includes a number of individual battery stack cells that are connected in series or parallel, depending on the targeted application. The power and energy specifications in a redox flow battery can be decoupled and therefore scaled independently depending on the application. The power is proportional to the stack size while the energy is proportional to the tank volume and concentration of active species in the electrolyte.

Figure 8:
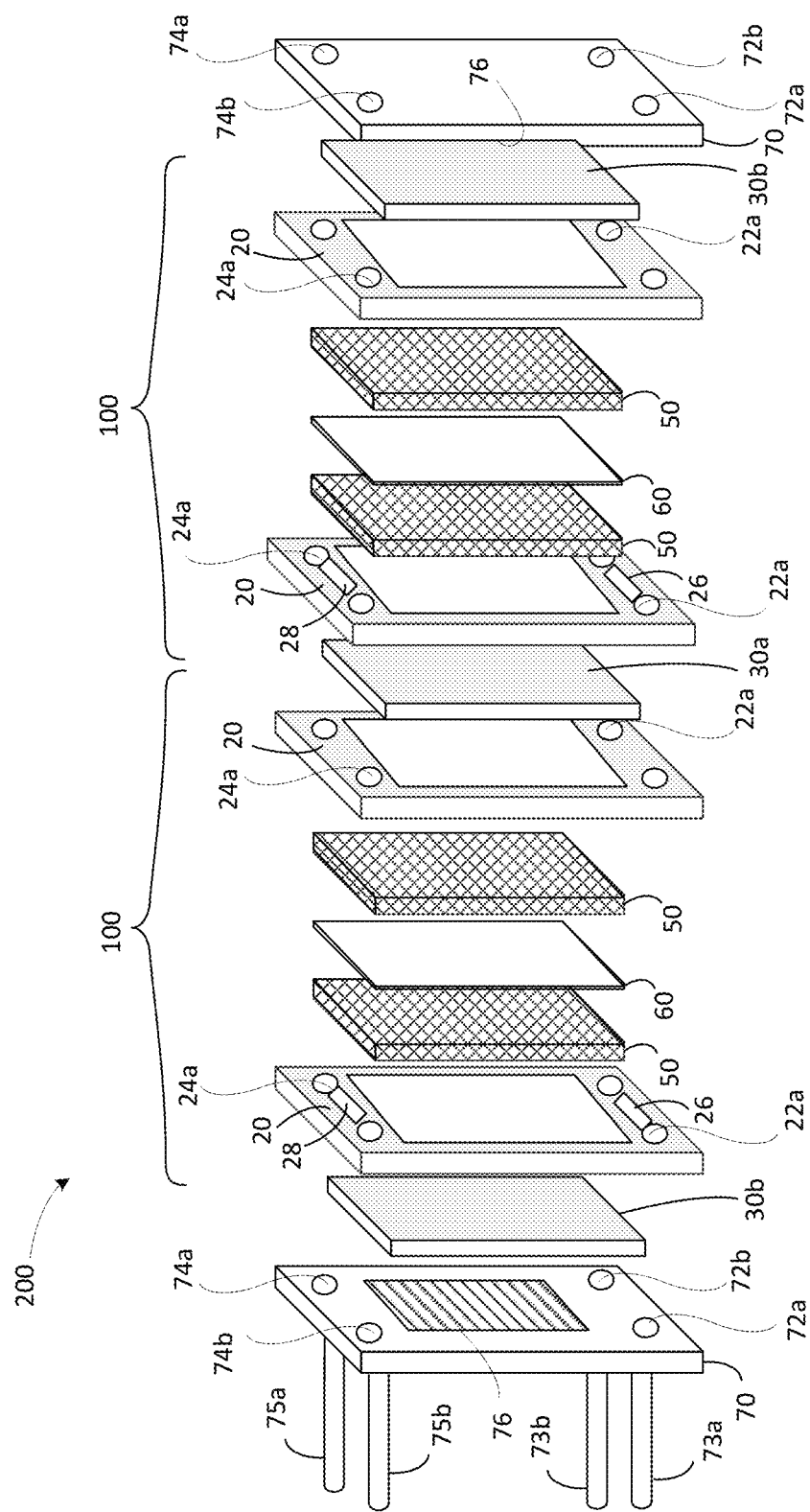
FIG. 8 is an exploded view of an exemplary redox flow battery stack.

FIG. 8 is an exploded view of one embodiment of a redox flow battery stack 200. The redox flow battery stack 200 comprises two endplates 70, and a plurality of redox flow battery stack cells 100 positioned between the endplates 70. Each stack cell 100 comprises an ion-exchange membrane 60, a support frame 20 and a bipolar plate 30a, 30b disposed on each side of the ion-exchange membrane 60, and an electrode 50 between each bipolar plate 30a, 30b and the ion-exchange membrane 60. The support frames 20 are oriented such that the inlet and outlet manifolds (not shown) are facing the electrodes. In the embodiment shown, two stack cells 100 are included, and the centrally located bipolar plate 30a is shared between the two stack cells. The centrally located bipolar plate 30a includes interdigitated flow channels on each of its surfaces. The bipolar plates 30b on each end of the stack include interdigitated flow channels on only one surface, i.e., the surface facing the electrode 50. The bipolar plates 30b on each end of the stack are in contact with an electrode and an end plate 70.

Each end plate 70 comprises an embedded current collector 76. When the redox flow battery stack 200 is assembled, the current collector 76 is in electrical communication with the stack cells 100. Suitable current collectors include, but are not limited to, copper and tin-coated copper current collectors. The end plate 70 is constructed of an insulative material. For example, the end plate 70 may be constructed of a plastic, such as polyvinyl chloride. Each end plate 70 further includes fluid inlet ports 72a, 72b and fluid outlet ports 74a, 74b. Fluid inlet ports 72a, 72b and fluid outlet ports 74a, 74b are cooperatively dimensioned and positioned to align with fluid inlet ports 22a, 22b and fluid outlet ports 24a, 24b, respectively, of support frames 20 when the redox flow battery stack 200 is assembled.

Electrolyte inlet conduits 73a, 73b are in fluid communication with the fluid inlet ports 72a, 72b, respectively, of the endplates 70 and the fluid inlet ports 22a, 22b, respectively, of the support frames 20. Electrolyte outlet conduits 75a, 75b are in fluid communication with the fluid outlet ports 74a, 74b, respectively, of the endplates 70 and the fluid outlet ports 24a, 24b, respectively, of the support frames 20. In some embodiments, a catholyte is flowed through one inlet conduit, e.g., 73a, and an anolyte is flowed through the other inlet conduit, 73b. The bipolar plates 30 and support frames 20 are arranged so that catholyte flows through the flow channels (not shown) on one side of each bipolar plate and anolyte flows through the flow channels on the other side of each bipolar plate.

A person of ordinary skill in the art will understand that the redox flow battery stack 200 may include one or more stack cells 100. For example, the redox flow battery stack may include from 1-40 stack cells, such as from 1-30, 1-25, or 3-25 stack cells.

Embodiments of the disclosed redox flow battery stacks are useful in redox flow stack batteries of many different chemistries, including but not limited to Fe/Cr, Fe/V, and vanadium (e.g., all vanadium and/or all-vanadium, mixed-acid) redox flow batteries.

IV. EXAMPLES

Example 1

Energy Efficiency of a Redox Flow Battery Including Three Stack Cells

A redox flow battery stack similar to that shown in FIG. 8 but comprising three stack cells was constructed. The stack cells included Nafion™ 211 ion-exchange membranes, ELAT® woven carbon cloth electrodes (two layers of carbon cloth for an overall thickness of about 800 µm, bipolar plates constructed of graphite-loaded vinyl ester with interdigitated flow channels as shown in FIG. 3, and support frames comprising inlet and outlet manifolds as shown in FIGS. 4A, 4B and 5A, 5B, respectively. The electrodes had a surface area of 3 $m^2$/g, 80% porosity, a conductivity of 2.7 S/cm, and an active area of 780 $cm^2$. The ion-exchange membranes had a thickness of 1 mil (25-26 µm) and a conductivity of about 0.1 S/cm; the membranes were soaked in deionized water prior to assembly. The end plates were constructed of polyvinyl chloride with embedded copper current collectors. An all-vanadium mixed-acid electrolyte prepared from $VOSO_4.xH_2O$, HCl, and $H_2SO_4$ was used. The electrolyte comprised 2M vanadium, 2M sulfate, and 5M chloride. The redox flow battery further included two electrolyte reservoirs and two centrifugal pumps to circulate electrolyte from the electrolyte reservoirs through the stack. Chillers were used to control the temperature to within a range of 20-60° C.

A pressure transducer was placed between each pump in the stack inlet to measure pressure drop in the cathode and anode pneumatic circuits. An Arbin Instruments BT-2000 battery tester was used to evaluate electrochemical performance, including cell voltages, flow, pressure, and temperature measurements. The voltage range was varied to compensate for ohmic losses and also ensure that the state of charge (SOC) range was held relatively constant between 15 and 85%.

Figure 9:
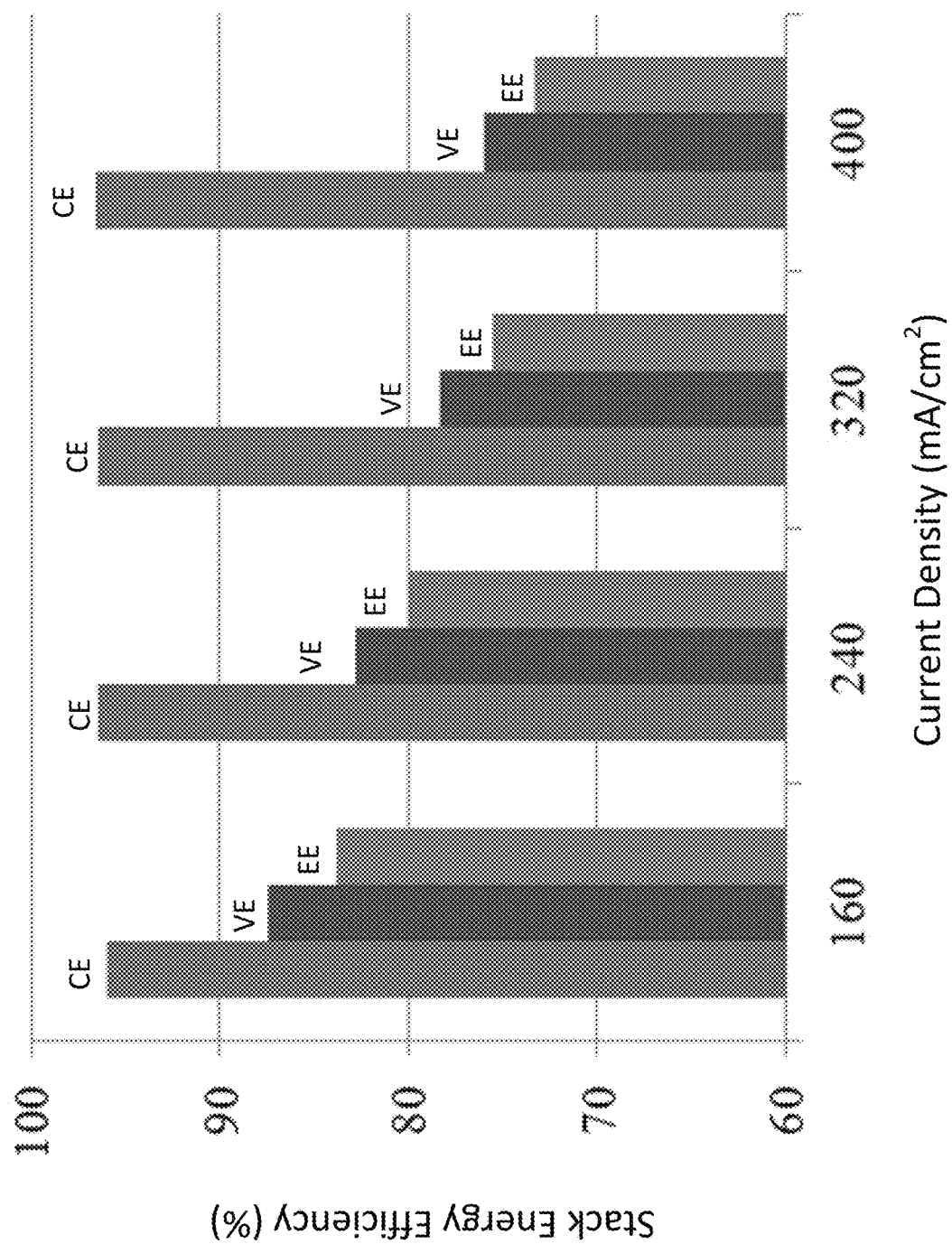
FIG. 9 is a graph of stack energy efficiency versus current density for a redox flow battery comprising three stack cells comprising Nafion™ 211 ion-exchange membranes, woven carbon cloth electrodes, bipolar plates with interdigitated flow channels as shown in FIG. 3, and support frames comprising inlet and outlet manifolds as shown in FIGS. 4 and 5, respectively.

As shown in FIG. 9, the redox flow battery exhibited a coulombic efficiency (CE) of at least 95% over a current density range from 160-400 mA/cm². Voltage efficiency ranged from about 87% at 160 mA/cm² to 75% at 400 mA/cm². Energy efficiency ranged from about 84% at 160 mA/cm² to about 74% at 400 mA/cm². The coulombic and energy efficiencies are defined as:

$$\text{Stack coulombic efficiency }(CE) = \frac{\int i_d dt}{\int i_c dt}$$

$$\text{Stack energy efficiency}(EE) = \frac{\int p_d dt}{\int p_c dt} = \frac{\int V_d i_d dt}{\int V_c i_c dt}$$

where i denotes current, p is power, V is voltage, and c and d denote charging and discharging, respectively.

Example 2

Energy Efficiency and Power of a Redox Flow Battery Including 20 Stack Cells

Figures 10, 11:
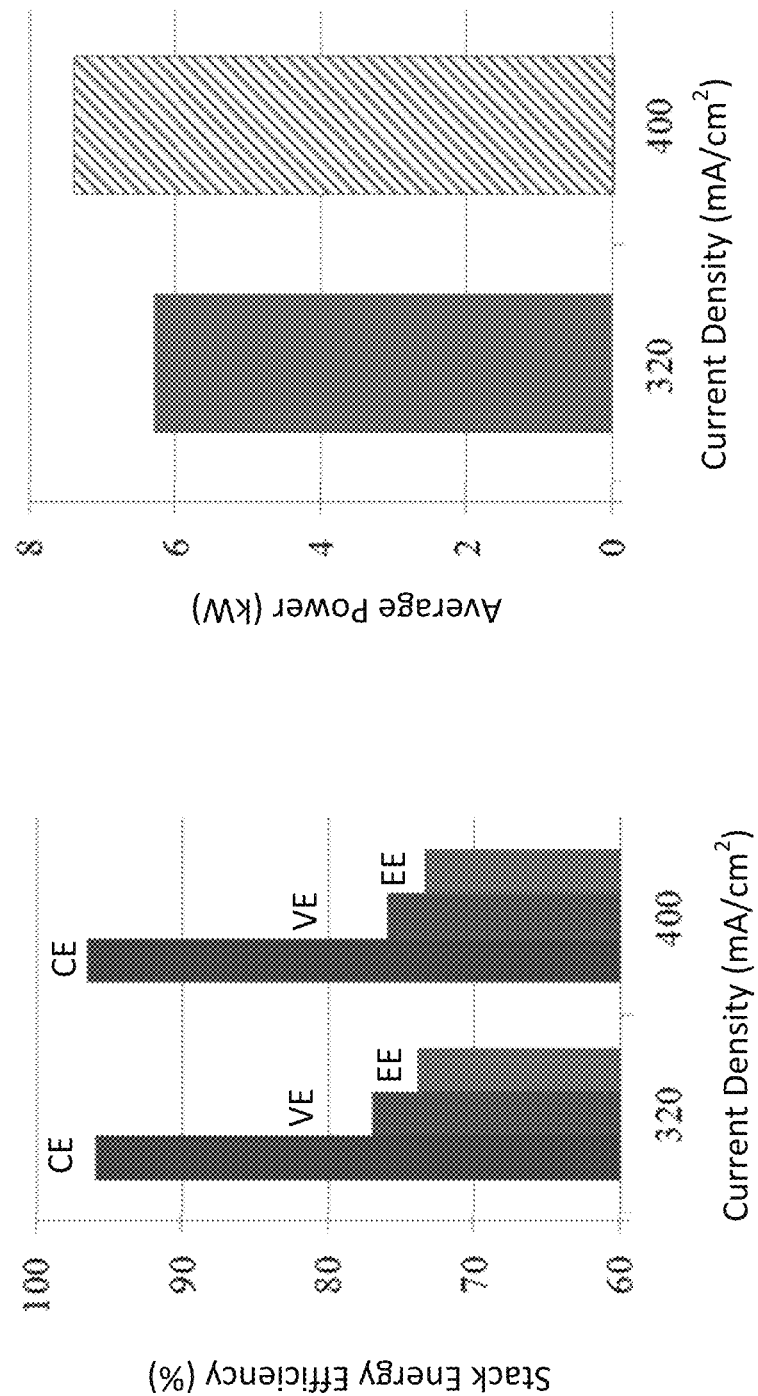
FIG. 10 is a graph of stack efficiency for two redox flow batteries including 20 stack cells, but differing inlet and outlet manifolds and bipolar plates.
FIG. 11 is a graph of average power for the redox flow batteries of FIG. 10.

A redox flow battery similar to that of Example 1, but comprising 20 stack cells was constructed. Using the same electrolyte as Example 1, the redox flow battery provided a coulombic efficiency of about 96%, a voltage efficiency of about 75%, an energy efficiency of about 74%, and an average power of 7.4 kW at a current density of 400 mA/cm² (right data sets, FIGS. 10 and 11). In contrast, a comparable redox flow battery stack comprising inlet and outlet manifolds as shown in FIG. 6B, Nafion™ 212 ion-exchange membranes (2 mil thickness), and laminated bipolar plates comprising five layers of graphite and including interdigitated flow channels provided a coulombic efficiency of about 95%, a voltage efficiency of about 76%, an energy efficiency of about 74% and an average power of just 6.3 kW at 320 mA/cm² (left data sets, FIGS. 10, 11). Although voltage efficiency and energy efficiency typically decrease as current density is increased, the redox flow battery including stack cells as disclosed herein provided substantially similar efficiencies at a higher current density compared the battery using an older manifold design. Furthermore, the manifolds of FIGS. 4A-5B and monolithic bipolar plates of FIG. 3 provided a 35% increase in power.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A redox flow battery stack cell frame, comprising a quadrilateral support frame and a quadrilateral, monolithic bipolar plate integrated with the quadrilateral support frame, wherein:
   the quadrilateral, monolithic bipolar plate has a first side edge, an opposing side edge, a length $L_P$ between the first side edge and the opposing side edge, a first surface, an opposing surface, and a depth $D_P$ between the upper surface and the lower surface, the bipolar plate comprising a plurality of interdigitated flow channels in the first surface, the interdigitated flow channels comprising alternating inlet flow channels and outlet flow channels, each channel having a depth $D_C$ less than 0.5× the depth $D_P$ of the bipolar plate, wherein
   (i) the inlet flow channels extend inwardly from the first side edge of the bipolar plate and have a length $L_I$ less than the length $L_P$ between the first side edge and opposing side edge of the bipolar plate, and
   (ii) the outlet flow channels extend inwardly from the opposing side edge of the bipolar plate and have a length $L_O$ less than the length $L_P$ between the first side edge and opposing side edge of the bipolar plate;
   the quadrilateral support frame has a facing surface and an opposing surface, and defines an open space sized to receive the bipolar plate, wherein an inner edge of the support frame is in contact with the bipolar plate, the support frame comprising
   an inlet port extending through a first side of the support frame,
   an inlet manifold formed into the facing surface of the first side of the frame and in fluid communication with the inlet port, the inlet manifold comprising a plurality of spaced-apart fluid inlet distribution channels in a serpentine arrangement, each fluid inlet distribution channel extending from the inlet port parallel to an edge of the first side for a first distance, and then diverging such that an outlet of the fluid inlet distribution channel is aligned in fluid communication with a single inlet flow channel of the bipolar plate,
   an outlet port extending through an opposing side of the frame, and
   an outlet manifold formed into the facing surface of the opposing side of the frame and in fluid communication with the outlet port, the outlet manifold comprising a plurality of spaced-apart fluid outlet distribution channels in a serpentine arrangement, each fluid outlet distribution channel extending from the outlet port parallel to an edge of the opposing side for a first distance, and then diverging such that an inlet of the fluid outlet distribution channel is aligned in fluid communication with a single outlet flow channel of the bipolar plate.

2. The redox flow battery stack cell frame of claim 1, wherein the bipolar plate further comprises a plurality of interdigitated flow channels in the opposing surface.

3. The redox flow battery stack cell frame of claim 1, wherein the support frame is constructed of glass fiber-loaded vinyl ester.

4. The redox flow battery stack cell frame of claim 1, wherein the bipolar plate is constructed of graphite-loaded vinyl ester.

5. The redox flow battery stack cell frame of claim 1, wherein each inlet flow channel and outlet flow channel of the bipolar plate has a central lengthwise axis A, an opening width W of 1-15 mm, and a taper along the central lengthwise axis A of from 0-5°.

6. The redox flow battery stack cell frame of claim 5, wherein a pitch P between each inlet or outlet flow channel and an adjacent outlet or inlet flow channel, respectively, is from 2-8× the opening width of the inlet or outlet flow channel, wherein the pitch is the distance between the central lengthwise axis A of the inlet or outlet flow channel and the central lengthwise axis A of the adjacent outlet or inlet flow channel, respectively.

7. The redox flow battery stack cell frame of claim 1, wherein each fluid inlet distribution channel and the fluid outlet distribution channel independently has a length/cross-sectional area ratio within a range of 15-25.

8. The redox flow battery stack cell frame of claim 7, wherein each fluid inlet distribution channel has the same length/cross-sectional area ratio and each fluid outlet distribution channel has the same length/cross-sectional area ratio.

9. The redox flow battery stack cell frame of claim 1, wherein each fluid inlet distribution channel and fluid outlet distribution channel independently has:
   (i) a length within a range of from 50 mm to 1000 mm;
   (ii) a depth within a range of from 0.5 to 3 mm;
   (iii) a width within a range of from 2 mm to 25 mm; or
   (iv) any combination of (i), (ii), and (iii).

10. A redox flow battery stack cell comprising:
    an ion-exchange membrane;
    two redox flow battery stack cell frames according to claim 1 positioned on either side of the ion-exchange membrane such that the inlet manifolds and the outlet manifolds of the support frames are facing the ion-exchange membrane; and
    two electrodes, each electrode positioned between, and in contact with, the ion-exchange membrane and a bipolar plate of one of the two redox flow battery stack cell frames.

11. The redox flow battery stack cell of claim 10, wherein the ion exchange membrane comprises a perfluorosulfonic acid/polytetrafluoroethylene copolymer in a protonated form.

12. The redox flow battery stack cell of claim 10, wherein the ion-exchange membrane has a thickness of 25-175 μm.

13. The redox flow battery stack cell of claim 10, wherein the electrode comprises woven carbon cloth.

14. A redox flow battery stack, comprising a stack body comprising a plurality of stacked redox flow battery stack cells according to claim 10, wherein each bipolar plate positioned between two electrodes in the stack body:
    (i) comprises a plurality of interdigitated flow channels on the first surface and a plurality of interdigitated flow channels on the opposing surface, and
    (ii) is integrated into a two support frames, each support frame adjacent to one of the two electrodes, and each comprising an inlet manifold and an outlet manifold facing the adjacent electrode.

15. The redox flow battery stack of claim 14, further comprising an end plate arranged at each end of the stack body, each end plate comprising:
    a current collector in electrical communication with the stacked redox flow battery stack cells;
    two electrolyte inlet ports; and
    two electrolyte outlet ports, wherein the electrolyte inlet ports and outlet ports are in fluid communication with the inlet ports and outlet ports of the support frames.

16. The redox flow battery stack of claim 14, further comprising:
    two electrolyte inlet conduits, each electrolyte inlet conduit in fluid communication with an electrolyte inlet port of one end plate;
    two electrolyte outlet conduits, each electrolyte outlet conduit in fluid communication with an electrolyte outlet port of one end plate.

* * * * *